US008892086B2

(12) United States Patent
Parry et al.

(10) Patent No.: US 8,892,086 B2
(45) Date of Patent: Nov. 18, 2014

(54) MOBILE EQUIPMENT CUSTOMIZATION USING A SINGLE MANUFACTURING CONFIGURATION

(71) Applicants: Research In Motion Limited, Waterloo (CA); QNX Software Systems Limited, Kanata (CA)

(72) Inventors: Thomas Owen Parry, Cambridge (CA); Robert David Turner, Ottawa (CA); Timothy Ryan Salter, Guelph (CA); Nicole Melissa Debickes, Boca Raton, FL (US); David Brandon Sosby, Carrollton, TX (US); Melanie Arlene Barker, Kanata (CA); Martin John Bowyer, Burnaby (CA); Douglas Eugene Ross, Davie, FL (US); Richard Enrique Lopez, Miami, FL (US); Paul Munguia, Plantation, FL (US); Cora Lynne Collins, Dunrobin (CA); James Arthur Bruck, Kanata (CA)

(73) Assignees: BlackBerry Limited, Waterloo (CA); 2236008 Ontario Inc., Waterloo (CA)

( * ) Notice: Subject to any disclaimer, the term of this patent is extended or adjusted under 35 U.S.C. 154(b) by 0 days.

(21) Appl. No.: 13/753,187

(22) Filed: Jan. 29, 2013

(65) Prior Publication Data
US 2014/0213233 A1 Jul. 31, 2014

(51) Int. Cl.
*H04M 3/00* (2006.01)
*H04W 24/02* (2009.01)

(52) U.S. Cl.
CPC ..................................... *H04W 24/02* (2013.01)
USPC ............................ 455/418; 455/419; 455/420

(58) Field of Classification Search
USPC .................................................. 455/420, 419
See application file for complete search history.

(56) References Cited

U.S. PATENT DOCUMENTS

| | | | |
|---|---|---|---|
| 6,223,290 B1 | 4/2001 | Larsen et al. | |
| 6,321,079 B1 | 11/2001 | Cooper | |
| 7,088,988 B2 | 8/2006 | Kelkar et al. | |
| 7,929,959 B2 * | 4/2011 | De Atley et al. | 455/418 |
| 8,032,181 B2 | 10/2011 | Hauck et al. | |
| 8,112,118 B2 | 2/2012 | Shieh et al. | |
| 2001/0001875 A1 | 5/2001 | Hirsch | |
| 2009/0181662 A1 | 7/2009 | Fleischman et al. | |
| 2010/0195833 A1 | 8/2010 | Priestley et al. | |
| 2012/0264400 A1 | 10/2012 | Khan et al. | |
| 2013/0331067 A1 * | 12/2013 | Coussemaeker et al. | 455/412.2 |

FOREIGN PATENT DOCUMENTS

EP 1596622 B1 4/2007

OTHER PUBLICATIONS

ETSI TS 122 022 V11.0.0 (Oct. 2012).
Extended European Search Report, Application No. 13163391.9, Dated Jul. 10, 2014.

* cited by examiner

*Primary Examiner* — Sharad Rampuria
*Assistant Examiner* — Sayed T Zewari
(74) *Attorney, Agent, or Firm* — Ridout & Maybee LLP

(57) ABSTRACT

Personalization of a mobile device, including receiving at the mobile device a unique code; selecting, from a plurality of personalization policies stored on the mobile device a personalization policy that corresponds to the unique code; and storing the selected personalization policy in a persistent protected storage element of the mobile device. Customizing a mobile device, including determining at the mobile device a unique code; selecting, from a plurality of customized data sets stored on the mobile device a data set that corresponds to the unique code; and activating the selected data set on the mobile device.

21 Claims, 6 Drawing Sheets

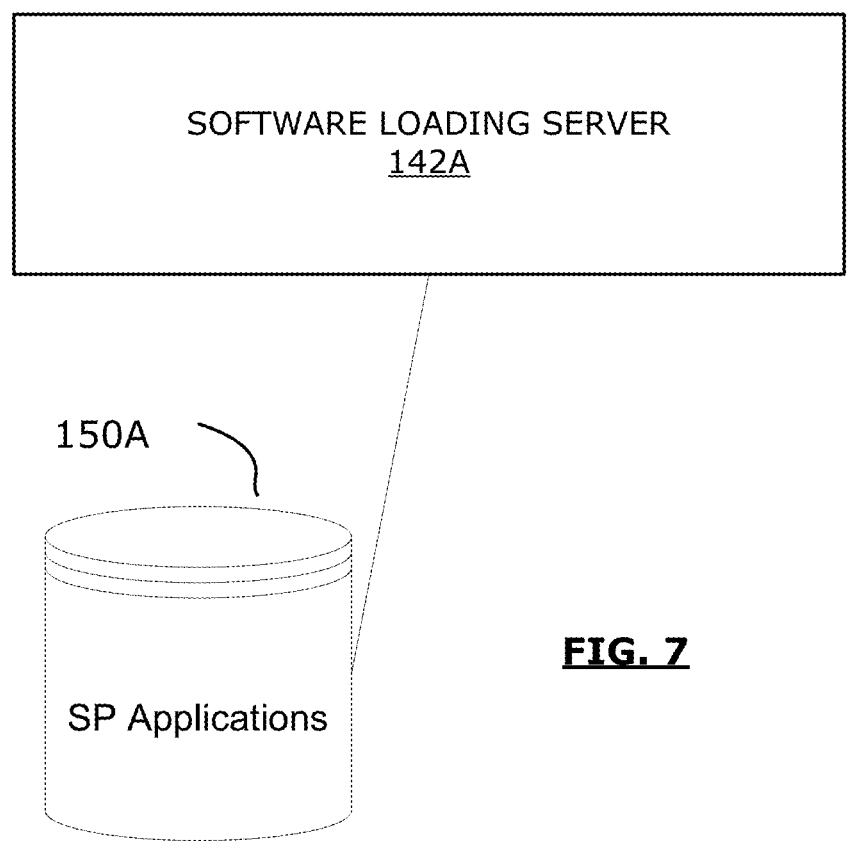

MOBILE EQUIPMENT CUSTOMIZATION USING A SINGLE MANUFACTURING CONFIGURATION

TECHNICAL FIELD

The present disclosure relates to customizing mobile equipment for service providers.

BACKGROUND

A mobile device manufacturer will frequently provide the same type of device to service providers such as network operators and carriers. The devices are personalized or otherwise customized for each service provider, which can for example include personalizing mobile devices to so that they can only be used with that particular service provider.

The Third Generation Partnership Project (3GPP) has generated technical specifications in respect of personalization of Mobile Equipment (ME), as set out for example in 3GPP TS 22.022 version 11.0.0 Release 11. The personalization of ME (MEP) standard provides specifications for various personalization categories including: service provider personalization, network personalization, network subset personalization, corporate personalization, and SIM (Subscriber Identity Module) or USIM (User Services Identity Module, the equivalent of the SIM card for 3G UMTS mobile devices) personalization. Any combination of these personalization categories may be activated or deactivated on a mobile device as they operate independently of each other, and any one personalization category may have more than one personalization code configured (e.g. configuring a mobile device to be operable on more than one service provider's network). Some codes require other codes to be activated as well, defining a code group. For instance, service provider personalization requires activation of both service provider and network codes.

The use of a mobile device is limited based on the activated personalization categories, the personalization codes of which are compared against values stored on the inserted SIM/USIM card whenever the mobile device is powered on or a SIM/USIM is inserted. If the check fails, the mobile device is placed into a limited service mode in which only emergency calls are possible. If a match is found with any of the code groups stored in the mobile device, the check is passed for that category and the mobile device enters normal operation, albeit restricted in its use to a personalization policy determined by the activated personalization codes (e.g. the mobile device may only be operable in normal operation mode on the network of service provider "C").

BRIEF DESCRIPTION OF THE DRAWINGS

FIG. 7 illustrates a software loading server and database in accordance with an example embodiment.

DETAILED DESCRIPTION

Figure 1:
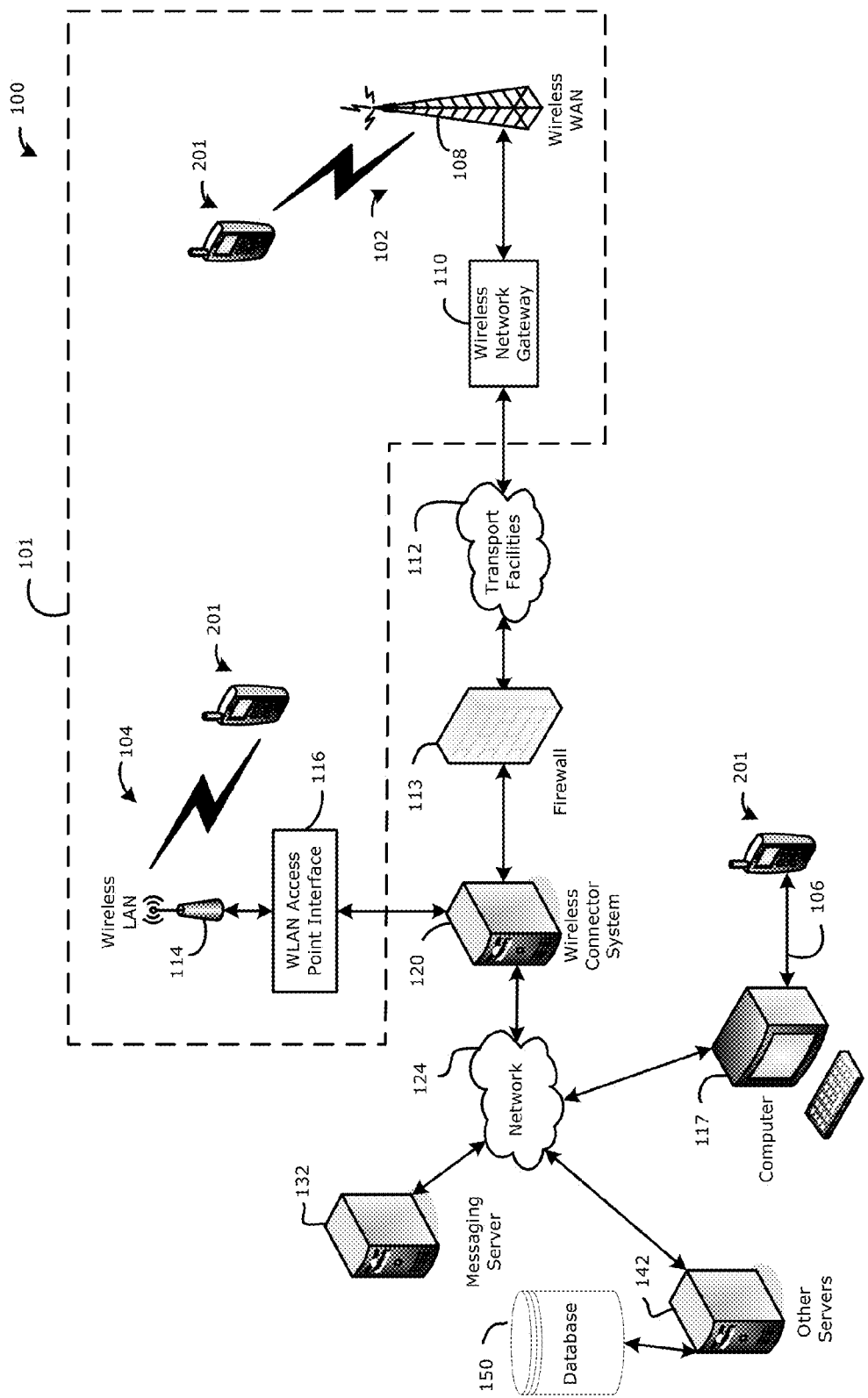
FIG. 1 is a block diagram illustrating a communication system including a mobile communication device to which example embodiments of the present disclosure can be applied.

As noted above, specifications such as 3GPP TS 22.022 provide for the personalization of Mobile Equipment (MEP). MEP requirements can present challenges for organizations such as manufacturers who provide mobile devices to multiple service providers as the device provider must ensure that each mobile device is pre-configured with the correct service provider (SP) personalization policy for the service provider that the device will ultimately be supported by. Pre-configuring a mobile device can involve burning the SP personalization policy into a persistent protected memory of the mobile device, effectively locking the mobile device to a specific network provider, a process referred to herein as "MEP locking". MEP locking can, for example, be performed at an assembly location for the mobile device. However, in order to maintain flexibility in the mobile device distribution chain it is desirable to delay MEP locking of a mobile device to later points in the distribution chain.

Accordingly, example embodiments are described herein which allow MEP locking of mobile devices to be performed post-assembly in the mobile device distribution chain.

One example embodiment relates to personalization of a mobile device, including receiving at the mobile device a unique code; selecting, from a plurality of personalization policies stored on the mobile device a personalization policy that corresponds to the unique code; and storing the selected personalization policy in a persistent protected storage element of the mobile device.

Another example embodiment related to customizing a mobile device, including determining at the mobile device a unique code; selecting, from a plurality of customized data sets stored on the mobile device a data set that corresponds to the unique code; and activating the selected data set on the mobile device. According to one example embodiment there is provided a method for customizing a mobile device. The method includes receiving at the mobile device information providing a service provider identity; selecting, from a plurality of customized data sets stored on the mobile device a data set that corresponds to the service provider identity; and activating the selected data set on the mobile device.

According to another example embodiment there is provided a mobile device configured to automatically customize for a service provider. The device includes a controller for controlling the operation of the device; a communication subsystem connected to the controller configured for at least data communication with a wireless network; and a first storage element having stored thereon a plurality of customized data sets, each customized data set being indexed by a unique service provider identity. The controller being configured for: receiving service provider identity information; selecting, from the plurality of customized data sets a data set indexed by the unique service provider identity that corresponds to the received service provider identity information; and activating the selected data set on the mobile device.

Reference will now be made to the accompanying drawings. For simplicity and clarity of illustration, reference numerals may be repeated among the Figures to indicate corresponding or analogous elements. Numerous details are set forth to provide an understanding of the example embodiments described herein. The example embodiments may be practised without some of these details. In other instances, well-known methods, procedures, and components have not been described in detail to avoid obscuring the example embodiments described. The description is not to be considered as limited to the scope of the example embodiments described herein.

Reference is first made to FIG. 1 which shows in block diagram form a communication system 100 in which example embodiments of the present disclosure can be applied. The communication system 100 comprises a number of mobile communication devices (mobile devices) 201 which may be connected to the remainder of system 100 in any of several different ways. Accordingly, several instances of mobile communication devices 201 are depicted in FIG. 1 employing different example ways of connecting to system 100. Mobile communication devices 201 are connected to a wireless communication network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realised using the Internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 14 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email messages, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email messaging server) and optionally other servers 142. The other servers 142 may comprise a content server for providing content such as internet content or content from an organization's internal servers to the mobile communication devices 201 in the wireless network 101, and an application server for implementing server-based applications such as instant messaging (IM) applications. The other servers 142 may be connected to databases 150 required by the other servers 142 to carry out certain functions of the other servers 142.

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data.

The wireless network gateway 110 is adapted to send data packets received from the mobile device 201 over the WWAN 102 to the wireless connector system 120. The wireless connector system 120 then sends the data packets to the appropriate connection point such as the messaging server 132, content server 142 or application servers 142. Conversely, the wireless connector system 120 sends data packets received, for example, from the messaging server 132, content server 142 or application servers 142 to the wireless network gateway 110 which then transmit the data packets to the destination mobile device 201. The AP interfaces 116 of the WLAN 104 provide similar sending functions between the mobile device 201, the wireless connector system 120 and network connection point such as the messaging server 132, content server 142 and application server 142.

The network 124 may comprise a private local area network, metropolitan area network, wide area network, the public Internet or combinations thereof and may include virtual networks constructed using any of these, alone, or in combination.

A mobile device 201 may alternatively connect to the wireless connector system 120 using a computer 117, such as desktop or notebook computer, via the network 124. A link 106 may be provided for exchanging information between the mobile device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile device 201 and computer 117. The short-range wireless communication interface may be a personal area network (PAN) interface. A personal area network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the Bluetooth® special interest group, or IEEE 802.15.3a, also referred to as Ultra-Wideband (UWB), or other PAN connection.

It will be appreciated that the above-described communication system is provided for the purpose of illustration only, and that the above-described communication system comprises one possible communication network configuration of a multitude of possible configurations for use with the mobile communication devices 201. The teachings of the present disclosure may be employed in connection with any other type of network and associated devices that are effective in implementing or facilitating wireless communication. Suitable variations of the communication system will be understood to a person of skill in the art and are intended to fall within the scope of the present disclosure.

Figure 2:
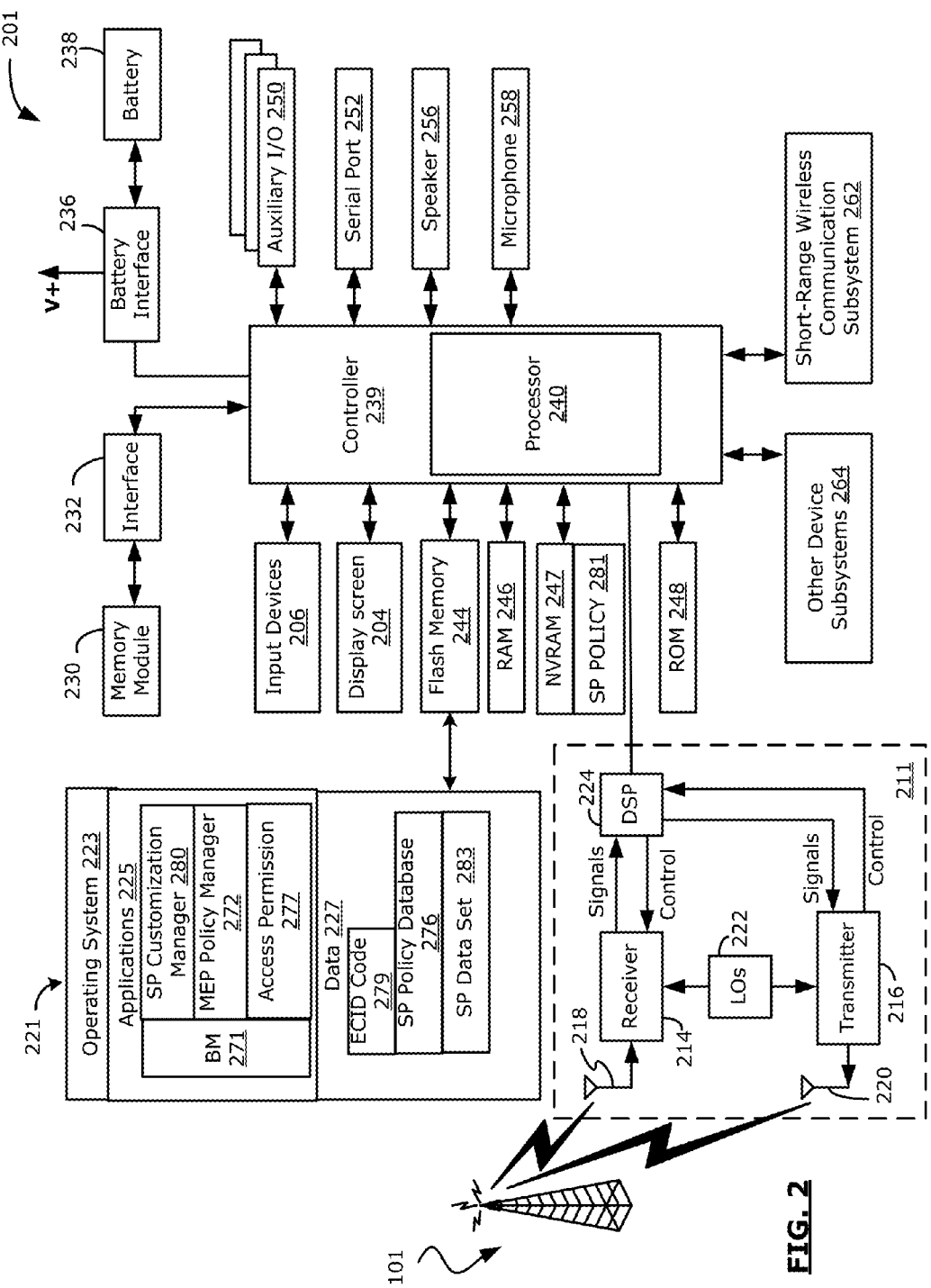
FIG. 2 is a block diagram illustrating a mobile communication device in accordance with one example embodiment of the present disclosure.

Reference is now made to FIG. 2 which illustrates a mobile device 201 in which example embodiments described in the present disclosure can be applied. The mobile device 201 is a two-way communication device having data and voice communication capabilities, and the capability to communicate with other computer systems, for example, via the Internet. Depending on the functionality provided by the mobile device 201, in various embodiments the device 201 may be a multiple-mode communication device configured for both data and voice communication, a smartphone, a mobile telephone, a PDA (personal digital assistant) enabled for wireless communication, or a computer system with a wireless modem.

The mobile device 201 includes a rigid case (not shown) housing the components of the device 201. The internal components of the device 201 are constructed on a printed circuit board (PCB). The mobile device 201 includes a controller 239 comprising at least one processor 240 (such as a microprocessor) which controls the overall operation of the device 201. The processor 240 interacts with device subsystems such as a wireless communication subsystem 211 for exchanging radio frequency signals with the wireless network 101 to perform communication functions. The processor 240 interacts with additional device subsystems including a display screen 204 such as a liquid crystal display (LCD) screen, input devices 206 such as a keyboard and control buttons, flash memory 244, random access memory (RAM) 246, non-volatile random access memory (NVRAM) 247, read only memory (ROM) 248, auxiliary input/output (I/O) subsystems 250, data port 252 such as a serial data port, such as a Universal Serial Bus (USB) data port, speaker 256, microphone 258, short-range wireless communication subsystem 262, and other device subsystems generally designated as 264. Some of the subsystems shown in FIG. 2 perform communication-related functions, whereas other subsystems may provide "resident" or on-device functions.

The device 201 may comprise a touchscreen display in some embodiments. The touchscreen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller.

The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile device 201 and a single antenna may be shared by both receiver and transmitter, as is known in the art. As will be apparent to those skilled in the field of communication, the particular design of the wireless communication subsystem 211 depends on the wireless network 101 in which mobile device 201 is intended to operate.

The mobile device 201 may communicate with any one of a plurality of fixed transceiver base stations 108 of the wireless network 101 within its geographic coverage area. The mobile device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are input to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The processor 240 operates under stored program control and executes software modules 221 stored in memory such as persistent memory, for example, in the flash memory 244. As illustrated in FIG. 2, the software modules 221 comprise operating system software 223 and software applications 225. Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 225 may include a range of applications, including, for example, an email messaging application, address book, calendar application, notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (i.e. the display screen 204) according to the application. Data 227 for use by applications 225 can also be stored on flash memory 244.

In some embodiments, the auxiliary input/output (I/O) subsystems 250 may comprise an external communication link or interface, for example, an Ethernet connection. The mobile device 201 may comprise other wireless communication interfaces for communicating with other types of wireless networks, for example, a wireless network such as an orthogonal frequency division multiplexed (OFDM) network or a GPS (Global Positioning System) subsystem comprising a GPS transceiver for communicating with a GPS satellite network (not shown). The auxiliary I/O subsystems 250 may comprise a pointing or navigational tool (input device) such as a clickable trackball or scroll wheel or thumbwheel, or a vibrator for providing vibratory notifications in response to various events on the device 201 such as receipt of an electronic message or incoming phone call, or for other purposes such as haptic feedback (touch feedback).

In some embodiments, the mobile device 201 also includes a removable memory card 230 (typically comprising flash memory) and a memory card interface 232 that controls network access. Network access typically associated with a subscriber or user of the mobile device 201 via the memory card 230, which may be a Subscriber Identity Module (SIM) card for use in a GSM network or other type of memory card such as a User Services Identity Module (USIM) card for use in the relevant wireless network type. The memory card 230 is inserted in or connected to the memory card interface 232 of the mobile device 201 in order to operate in conjunction with the wireless network 101.

The mobile device 201 also stores other data 227 in an erasable persistent memory, which in one example embodiment is the flash memory 244. In various embodiments, the data 227 includes service data comprising information required by the mobile device 201 to establish and maintain communication with the wireless network 101. The data 227 may also include user application data such as email messages, address book and contact information, calendar and schedule information, notepad documents, image files, and other commonly stored user information stored on the mobile device 201 by its user, and other data. The data 227 stored in the persistent memory (e.g. flash memory 244) of the mobile device 201 may be organized, at least partially, into a number of databases each containing data items of the same data type or associated with the same application. For example, email messages, contact records, and task items may be stored in individual databases within the device memory. Other data, such as records of mobile equipment personalization codes, may be stored in the data 227 and contained in the flash memory 244.

The serial data port 252 may be used for synchronization with a user's host computer system (not shown). The serial data port 252 enables a user to set preferences through an external device or software application and extends the capabilities of the mobile device 201 by providing for information or software downloads to the mobile device 201 other than through the wireless network 101. The alternate download path may, for example, be used to load an encryption key onto the mobile device 201 through a direct, reliable and trusted connection to thereby provide secure device communication.

In some embodiments, the mobile device 201 is provided with a service routing application programming interface (API) which provides an application with the ability to route traffic through a serial data (e.g. USB) or short range peer-to-peer wireless (e.g. Bluetooth®) connection to the host computer system using standard connectivity protocols. When a user connects their mobile device 201 to the host computer system via, for example, a USB cable or Bluetooth® connection, traffic that was destined for the wireless network 101 is automatically routed to the mobile device 201 using the USB cable or Bluetooth® connection. Similarly, any traffic destined for the wireless network 101 is automatically sent over the USB cable or Bluetooth® connection to the host computer system for processing.

The mobile device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile device 201, and the battery interface 236 provides a mechanical and electrical connection for the battery 238. The battery interface 236 is coupled to a regulator (not shown) which provides power V+ to the circuitry of the mobile device 201.

The short-range communication subsystem 262 is an additional optional component which provides for communication between the mobile device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the mobile device 201 during or after manufacture. Additional applications and/or upgrades to the operating system 223 or software applications 225 may also be loaded onto the mobile device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), the NVRAM 247, or written into and executed from the RAM 246 for execution by the processor 240 at runtime. Such flexibility in application installation increases the functionality of the mobile device 201 and may provide enhanced on-device functions, communication-related functions, or both. For example, secure communication applications may enable electronic commerce functions and other such financial transactions to be performed using the mobile device 201.

The mobile device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the mobile device 201 may also compose data items, such as email messages, for example, using the input devices in conjunction with the display screen 204. These composed items may be transmitted through the communication subsystem 211 over the wireless network 101.

In the voice communication mode, the mobile device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile device 201. Although voice or audio signal output is typically accomplished primarily through the speaker 256, the display screen 204 may also be used to provide an indication of the identity of a calling party, duration of a voice call, or other voice call related information.

SP Personalization of Mobile Equipment

As noted above, example embodiments are described herein which allow MEP locking of a mobile device 201 to be performed post-assembly in the mobile device distribution chain. In this regard, the applications stored on a mobile device include a MEP policy manager module 272. In one example, the MEP policy manager module 272 is part of a set of instructions associated with a boot-up manager (BM) 271 resident on the mobile device 201.

Figure 3:
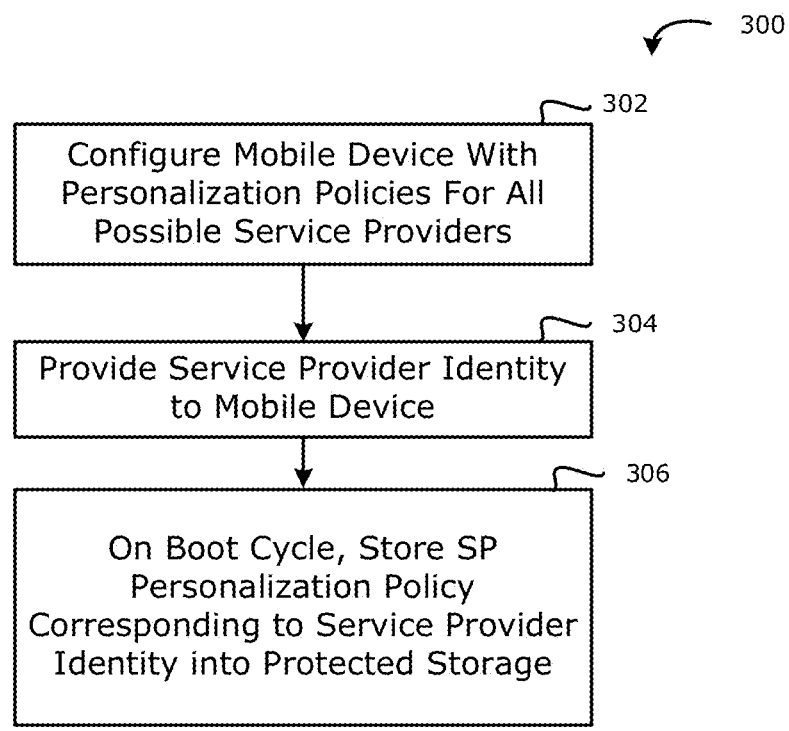
FIG. 3 is a flowchart illustrating an example method of mobile equipment personalization in accordance with one example embodiment of the present disclosure.

Referring now to FIG. 3, an example embodiment of implementing SP personalization is described. At action 302, a manufacturer of mobile devices 201 configures all mobile devices 201 with service provider specific data sets in the form of the SP personalization policies for all of the service providers which the mobile devices 201 may ultimately end up being allocated to. In one example embodiment, Action 302 is carried out as part of the basic software build for a mobile device 201, for example when operating system 223 is provided on mobile device 201. Action 302 could for example be carried out at the same facility at which the mobile device 201 is finally assembled, or could be at a component facility at which the circuit board for the mobile device 201 is assembled. Referring to FIG. 2, in an example embodiment, the SP personalization polices are stored in a SP policy database 276 as part of data 227 stored in erasable flash memory 244 of the mobile device 201, although the SP personalization policies could be stored in other persistent memory on the mobile device 201.

Each SP personalization policy stored in SP policy database 276 is indexed or otherwise associated with a unique service provider identifier such as an equipment carrier identifier (ECID) code and each SP personalization policy includes the codes or instructions required to lock the mobile device 201 to the associated service provider and, in at least some examples, a specific service provider network.

In some example embodiments, only a subset of SP personalization policies are stored in the SP policy database 276. For example, where it is known that one physical group of mobile devices 201 are destined for a first geographical region and another physical group of mobile devices are destined for another second geographical region, only the SP personalization policies for service providers in the first geographical region are stored on the first group of devices and only the SP personalization policies for the service providers in the second geographical region are stored on the second group of devices.

Accordingly, in example embodiments, once Action 302 has been performed, the mobile device 201 is generically provisioned with the SP personalization policies for all service providers to whom the mobile device 201 could logically be provided. The generically provisioned mobile device 201 can then be personalized at some point further down the supply chain for a specific service provider as indicated in Actions 304 and 306.

Figure 4:
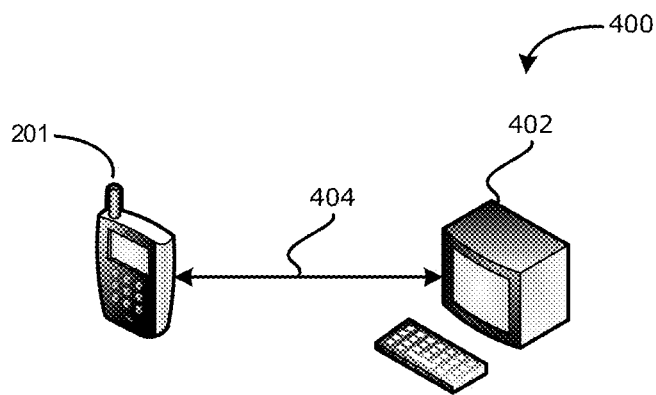
FIG. 4 illustrates an example system of mobile equipment personalization using a configuring device in accordance with one example embodiment of the present disclosure.

Action 304 occurs once a distribution decision has been made to provide a particular mobile device 201 to a particular service provider. By way of example, Action 304 could occur at a packaging and distribution facility where batches of mobile devices 201 are provisioned and packaged for specific service providers. At Action 304, the ECID code for the service provider to which the mobile device 201 is to be locked is provided to and stored on the mobile device. By way of example, FIG. 4 schematically represents a workstation 400 at which an ECID code is inserted into mobile device 201 according to action 304. In FIG. 4, the mobile device 201 is connected by a communication link 404, which could for example includes a wired link such as a USB cable, to a configuration terminal 402 that is configured to write the ECID code to the mobile device 201. The configuration terminal 402 could for example be set up by an operator to write a specified ID code to a batch of predetermined quantity of mobile devices that are connected to the configuration terminal 402, which at the same time obtains from and records unique identifiers from each of the mobile devices 201. In an example embodiment, the ECID code is written to a predetermined memory location 279 on the mobile device 201, for example to a predetermined location of flash memory 244. In some example embodiments, the predetermined ECID code memory location 279 is pre-populated during the original device software build in Action 302 with a place-holder value that signifies that the mobile device 201 has not yet been provisioned with a specified ECID code—for example, a value of "0" or "999999" or other predetermined place holder could be written to the memory location 279 to signify that the device 201 has not yet been assigned to a specific service provider.

Upon completion of Action 304, the mobile device 201 has stored on it an SP policy database 276 that includes the service provider personalization policies for multiple service providers, as well as an ECID code that identifies the specific service provider for the specific mobile device 201. In at least some example embodiments, the ECID code memory location 279 is in re-writable persistent memory so that the opportunity remains to re-provision the mobile device for a different service provider in the event that a decision is made that requires that the device be routed to a different service provider. However, in alternative embodiments the ECID code memory location 279 is in protected non-volatile RAM (NVRAM) 247 such that the ECID code cannot be varied by unauthorized parties once it has been written to the mobile device 201.

Upon completion of Action 304, the mobile device 201 is ready to be placed in the distribution network of the service provider whose ECID code is stored in ECID code memory location 279. The final MEP locking of mobile device 201 occurs in Action 306. In particular, the mobile device 201 is configured to detect when the initial boot-up of the device 201 occurs subsequent to Action 304 and at that time select from the SP policy database 276 the specific SP personalization policy associated with the ECID code stored at ECID code memory location 279. The selected SP personalization policy 281 is then written to a protected persistent storage element on the mobile device 201 such as NVRAM 247. Any future network use of the mobile device 201 requires that the SP personalization policy 281 stored in protected persistent storage NVRAM 247 is consistent with any SIM/USIM module that is inserted in memory interface 232, thus "locking" the mobile device to the specific service provider. In example embodiments, NVRAM 247 is protected in that the data it contains cannot be erased by unauthorized parties. In one example, in order to remove a SP personalization policy 281 once it is stored in NVRAM 247 requires one or more of specialized access tools or codes that are controlled by the device manufacturer and its authorized agents.

In some applications, an initial boot cycle after action 304 may, for example, occur when a SIM/USIM card is inserted into the mobile device 201 at delivery to an end user and the mobile device 201 is first powered on. In an example embodiment, the boot-up manager 271 for the mobile device 201 is configured to determine if the boot cycle is the initial boot cycle and if so then activate the MEP policy manager 272. The MEP policy manager 272 is configured to determine if step 304 has been completed, and if so then perform the MEP locking as described above in respect of step 306. In one example embodiment, the MEP policy manager 272 is configured to determine if step 304 has been completed by checking the ECID code memory location 279 to determine if an ECID code has been stored to the mobile device 201 instead of a pre-determined place holder code. In some example embodiments, the MEP policy manager 272 may also be configured to check NVRAM 247 to determine if the mobile device 201 is ready for MEP locking—for example, the presence of an ECID code at memory location 279 combined with the absence of a corresponding SP personalization policy 281 in NVRAM 247 indicates that Action 304 has occurred but Action 306 needs to be performed.

It will be appreciated that process 300 delays the need to assign a mobile device 201 to a specific service provider to further in the distribution system than the software build/manufacturing stage. Additionally, even once a carrier-specific ECID code is provided to the device at Action 304, the option still exists to assign a different ECID code (and thus re-direct the device to a different carrier) up until the initial boot occurs, after which the device (and its end user) are locked to a specified service provider. As noted above, in some example embodiments the protected storage 247 in which the SP Policy 281 is stored may in some examples be erased by an authorized entity, allowing restricted parties to re-provision a mobile device 201 to a different service provider in some circumstances.

Figure 5:
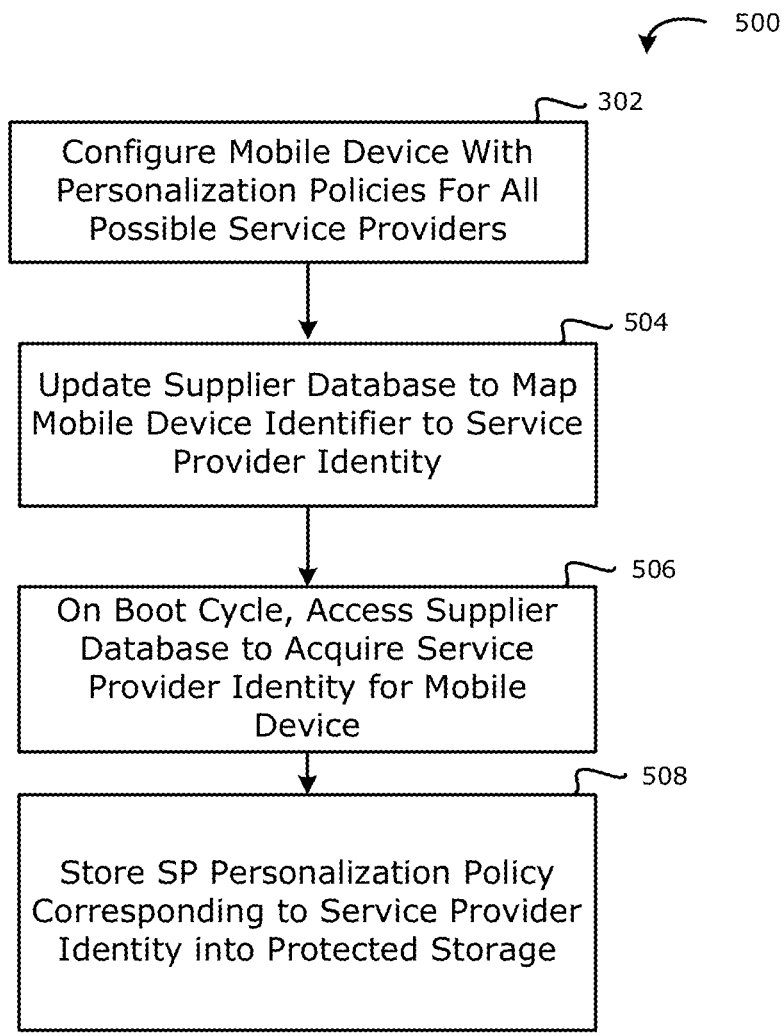
FIG. 5 is a flowchart illustrating an example method of mobile equipment personalization in accordance with one example embodiment of the present disclosure.

A variation on the MEP locking process 300 described above will now be described with reference to FIG. 5. The MEP locking process 500 of FIG. 5, which can also be applied to mobile device 201, is similar to that described above with the exception of differences that will be apparent from the following description. In one example embodiment, process 500 allows a mobile device 201 to be personalized for a specific service provider over-the-air once the device reaches an end user, providing enhanced supply chain flexibility.

MEP locking process 500 begins the same as process 300, with Action 302 carried out as part of the basic software build for a mobile device 201. As described above, a SP policy database 276 is stored on the flash memory 244 of mobile device 201 which includes the SP personalization polices for all service providers that the mobile device 201 could be allocated to, and each SP personalization policy stored in SP policy database 276 is indexed or otherwise associated with a unique service provider identifier such as an ECID code.

Once Action 302 has occurred in process 500, the mobile device 201 can be allocated to a service provider and placed in the service provider's distribution chain. In process 500, a Web accessible centralized database 150 (see FIG. 1) is updated to map a unique identifier for the mobile device 201 (for example, the device's International Mobile Equipment Identity (IMEI) number) to the service provider identifier (for example, the ECID code). The centralized database 150 could for example be maintained and updated by a manufacturer of the mobile devices with input from collaborating parties in the mobile device supply chain. The centralized database 150 allows mobile devices 201 to be dynamically allocated to respective service providers, and reallocated as necessary, right up until an initial device boot-up without requiring any changes to the SP personalization policies stored on the devices.

Upon completion of Action 504, the mobile device 201 is ready to be provided to an end user. As indicated in Action 506, the mobile device 201 is configured to detect when an initial boot-up of the mobile device 201 occurs—for example, when the mobile device 201 is first turned on with a SIM/USIM card inserted. When initial boot-up is detected, the MEP policy manger 272 causes the device 201 to automatically perform a wireless transaction through wireless communications network 101 to access Internet accessible centralized database 150. At the time that Action 506 is performed, the mobile device 201 has only restricted access to wireless network 101, but such access is sufficient to allow the MEP policy manager 272 to access a predetermined Internet address associated with the database 150 and provide a unique identifier for the mobile device 201 (for example its IMEI number) to database 150. In reply, the database 150 provides to the mobile device 201 the service provider identifier (for example the ECID code) for the service provider that the mobile device 201 is mapped to in database 150.

As indicated in Action 508, immediately after the ECID code is obtained from database 150, the MEP policy manager 272 selects from the SP policy database 276 the specific SP personalization policy associated with the received ECID code. The selected SP personalization policy 281 is then written to protected persistent storage element on the mobile device 201 such as NVRAM 247. Any future network use of the mobile device 201 requires that the SP personalization policy 281 stored in protected persistent storage NVRAM 247 is consistent with any SIM/USIM module that is inserted in memory interface 232, thus "locking" the mobile device to the specific service provider.

In some example embodiments, as part of Action 506 or 508 the mobile device 201 stores the ECID code in local storage such as flash memory 244 in a set or predetermined memory location 279 and overwrites a known place-holder value, providing a marker that Actions 506 and 508 have already been carried out in respect of the mobile device 201. In some example embodiments, Action 506 could be carried out using a physical connection between the mobile device and the Internet.

It would be appreciated by someone of skill in the art that database 150 can be updated with new ECID information at any time before the execution of either of steps 506 and 508. As noted above, database 150 may be maintained by the manufacturer or an entity other than the manufacturer downstream in the distribution chain of the device from the manufacturer, such as a company or other entity responsible for the logistics of distributing the mobile devices 201 to their respective destinations (e.g. to different service providers).

In some embodiments, the configuration terminal 402 used in Action 304 of process 300 could be configured to obtain the ECID code for a particular mobile device by accessing a database such as database 150 on which device identifiers are mapped to ECID codes.

Service Provider Device Customization

In addition to MEP locking, in some example embodiments the mobile device 201 is configured to allow for additional or alternative Service Provider (SP) customizations. In this regard, in addition to MEP policy manager module 272, the applications stored on a mobile device 201 can also include a Service Provider (SP) customization manager module 280. In some embodiments, the MEP policy manager module 272 may be a sub-module of Service Provider (SP) customization manager module 280. Service Provider (SP) customization manager module 280 may be part of a boot-up manager (BM) 271 resident on the mobile device 201.

Service providers such as carriers may have carrier specific branding, device configurations and error messages that they would like to have supported by mobile devices 201 used by their customers. For example, branding can include, among other things, default wallpaper, splashscreens, ringtones, icons and logos; device configuration can specify whether various device features are enabled or disabled or restricted and other device parameters, including for example parameters relating to Access Point Name (APN), Multimedia Messaging Service (MMS) APN, and restrictions on mobile hotspot, Near Field Communication (NFC) or WiFi usage. Error messages can include error codes and text, visual, audible or physical messages associated with various error codes, which may for example result from network or device errors.

The number of unique messages and configuration parameters per service provider could be in the hundreds or greater. Delaying device customization to as late as possible in the distribution chain, while at the same time limiting the amount of data that needs to be loaded onto a device at initial end-user boot-up is desired. Accordingly, an example embodiment is presented herein in which a mobile device manufacturer or provider pre-configures each mobile device 201 with carrier-specific message and configuration data for all service providers that the device 201 could ultimately be provided to. Upon initial boot-up by an end user, the device 201 activates the set of messages and configuration data that are associated with the service provider that it is activated with.

Figure 6:
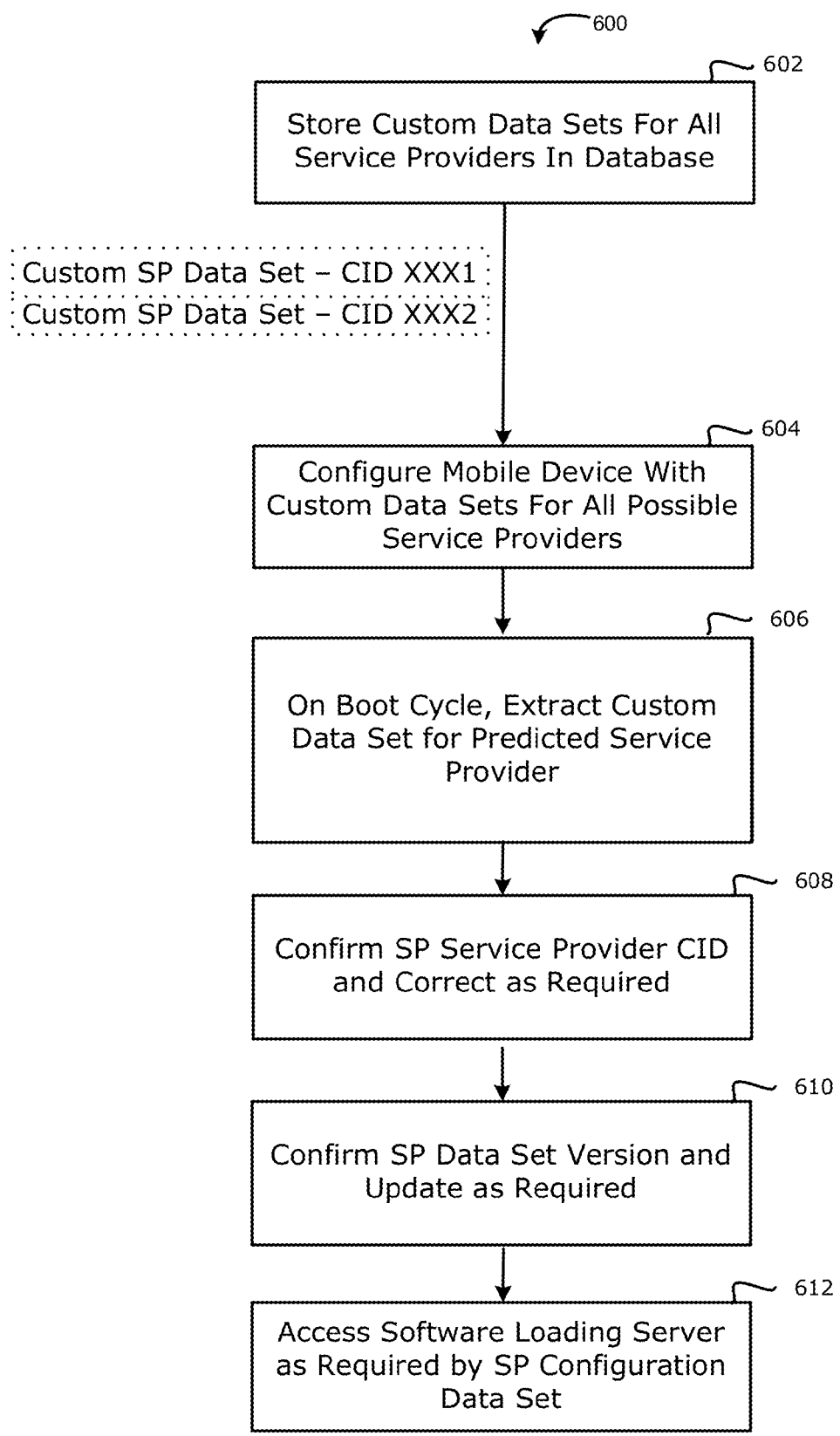
FIG. 6. is a flowchart illustrating an example method of mobile equipment service provider specific customization in accordance with one example embodiment of the present disclosure.

Referring now to FIG. 6, an example embodiment of implementing SP customization 600 is described. At action 602, a manufacturer of mobile devices 201 maintains a customization database that stores, for each service provider on whose network the mobile device 201 may be activated on, a unique service provider (SP) custom data set. The SP custom data set includes, for each service provider, one or more of the following: (1) An SP branding data set that includes all branding data that the service provider wants presented on mobile devices 201 it supports, including one or more files including one or more of image data, text data, sound data, audio data, physical vibration data and device light activation data; (2) An SP error message data set that includes all error messages that the service provider wants presented on mobile devices 201 it supports including one or more of image data, text data, sound data, audio data, physical vibration data and device light activation data; and (3) An SP device configuration data set that includes configuration data that the service provider wants applied to the mobile devices it supports, including for example parameters relating to APN, MMS APN, and restrictions on mobile hotspot, NFC or WiFi usage, among other things. At least some of the messages in the SP branding data set and the SP error message set are indexed by corresponding numerical message codes.

Each SP custom data set is mapped to a respective service provider (SP) identifier, which could for example be a Carrier identity (CID) which in turn could be mapped to other carrier identifying information such as but not limited to one or more of the following as appropriate: (Mobile Country Code) MCC, network subset code, service provider code, (Mobile Network Code) MNC, (Elementary File Group Identifier) EFGID, ICCID, ECID, International Mobile Equipment Identity (IMEI) or MSISDN. In one example embodiment, the device provider allows each service provider to have access to the customization database, for example through an Internet interface, so that individual service providers can each provide the data required for their respective custom data sets. In some examples, the data as provided by the respective service providers may be modified, re-formatted or compressed as desired for inclusion as SP data sets in the database. In some examples, SP data sets stored in the custom database are device specific, device software version specific, or specific to a geographic region. By way of example, geographic region could be determined in accordance with one or more of device IP address, region of first device activation, home country in which a subscriber agreement or warranty was established for a device, among other things. The custom database could for example be implemented at database 150.

As indicated at action 604, all mobile devices 201 are each provided with the SP data sets for all of the service providers that the mobile devices 201 may ultimately end up being allocated to. In one example embodiment, Action 604 is carried out as part of the basic software build for a mobile device 201, for example when operating system 223 is provided on mobile device 201. Action 604 could for example be carried out at the same facility at which the mobile device 201 is finally assembled, or could be at a component facility at which the circuit board for the mobile device 201 is assembled. Referring to FIG. 2, in an example embodiment, the SP data sets are stored as part of data 227 stored in erasable flash memory 244 of the mobile device 201 (for example as part of the SP policy database 276) although the SP data sets could be stored in other persistent memory on the mobile device 201.

As noted above, each SP data set stored in SP policy database 276 is indexed or otherwise associated with a unique SP identifier, and each SP data set includes one or more of the branding data set and error message/code data set and configuration parameter data set for the specific service provider.

In some example embodiments, only a subset of SP data sets from the custom database are stored in the SP policy database 276. Filtering could for example be formed based on device type or geographical destination.

Accordingly, in example embodiments, once action 604 has been performed, the mobile device 201 is generically provisioned with the SP data sets for all service providers to whom the mobile device 201 could logically be provided. The generically provisioned mobile device 201 can then be customized with a specific SP data set for a specific service provider as indicated in action 606.

Regarding Action 606, in an example embodiment, a boot-up manager 271 on the mobile device 201 is configured to detect when the mobile device 201 goes through boot-up for the first time subsequent to a new SIM or USIM card being inserted, thereby activating the device on a specific service provider's network. When the boot-up manager detects such a boot-up, the mobile device 201 is configured to predict the carrier ID (CID) for the specific service provider the mobile device is being activated with based on information included on the newly inserted SIM/USIM card. Fore example, the CID could be predicted based on one or more of Mobile Country Code (MCC), network subset code, service provider code, Mobile Network Code (MNC) or Elementary File Group Identifier (EFGID). The predicted CID is then used by the SP customization manager 280 to select and extract the corresponding SP data set 283 from the multiple message sets that are stored in the SP Policy Database 276, and the device 201 is configured to use the selected SP data set as its default SP data set 283 going forward. In some example embodiments, the selected data set is re-saved on the mobile device 201 in a different memory location or different format to mark it as the SP data set 283 for future default use. For example, the multiple SP data sets stored in SP policy database 276 could have been stored in a compressed format during the device software build, with the extracted SP data set 283 being unpacked and re-stored in a usable format in flash memory 244 once the actual service provider is determined in Action 606. In some embodiments, the SP data set 283 could be broken up into multiple service provider data sets stored on the mobile device 201, including for example an SP branding data set, an SP error message data set, and an SP configuration data set. In some example embodiments, any device parameters for which SP configuration data is included in the Data Set 283 are immediately set to the values specified in the SP configuration data.

In one example, the mobile device 201 includes default generic branding, error message and configuration data sets pre-stored in data 227 and Action 606 includes overwriting default values in the default data sets with corresponding values from the extracted SP data set 283. In some example embodiments if a service provider cannot be predicted in Action 606, the default data set is left as-is.

Accordingly, in some example embodiments once Action 606 is completed, the mobile device 201 is configured to operate using carrier specific parameters and to present carrier-specific branding messages or error messages as specified in the activated SP data set 283, By way of example, when an application or other software running on the mobile device 201 encounters a message code, the message code is cross-referenced to the selected SP data set 283 and the text or image or audio prompt or physical prompt or lighting prompt (or combinations thereof) that corresponds to the message code is displayed or otherwise activated.

In some example embodiments, the mobile device 201 is configured to repeat action 606 whenever a boot cycle occurs after a new SIM/USIM card is inserted, enabling the selected service provider specific data set 283 to be re-configured to the appropriate SP data set for the service provider associated with the new SIM/USIM card. In some example embodiments, the mobile device 201 is configured to repeat action 606 whenever any boot cycle occurs for any reason.

In some example embodiments, the service provider identifier used in Action 606 can be determined without referencing a SIM/USIM card. For example, the SP data sets stored in the SP policy database 276 could be indexed by ECID codes the same way as the SP personalization policies are described above in respect of FIGS. 3-5. In such example embodiments, the SP identity could be determined for the mobile device 201 as described in respect of Actions 304 or 506 above to determine an appropriate ECID code, and the corresponding SP data set 283 then activated.

It will thus be provided that customization process 600 permits a mobile device to be generically pre-loaded with one or more of messages, branding data and configuration data for several carriers early in the device supply chain, with one or more of the messages, branding data or configuration data for a specific carrier being activated at or near the end of the supply chain. In some examples, very specific configuration data can be included in the SP configuration data set, including but not limited to parameters specific to a vehicle/phone integration method or parameters specific to a mobile office setup.

In some example embodiments, it is possible that by the time that mobile device 201 boots up with a new SIM/USIM card installed in Action 606, the information included for a service provider in the factory-installed SP data sets (i.e. the SP data sets stored on the mobile device in Action 604) is out of date. Additionally, it may be possible in some embodiments that during Action 606 an incorrect SP identity was predicted (or not predicted at all) from the data contained on the SIM/USIM card. In this regard, in some example embodiments, process 600 includes verification actions 608 and 610 that occur subsequent to SP data set extraction action 606.

In an example embodiment, as indicated in verification action 608, the mobile device 201 is configured to do an over-the-air check on network 102 to confirm that the service provider it has been activated with is indeed the service provider that the mobile device 201 predicted in Action 606. If the actual service provider does not correspond to the service provider CID predicted in Action 606, the mobile device 201 can correct the predicted CID to match the actual CID derived from network 102, and then extract and activate the appropriate SP data set from the multiple SP data sets stored on the mobile device 201. It is possible that the SP data sets stored on the mobile device 201 do not include an SP data set for the actual service provider CID derived from network 102, in which case the mobile device 201 is configured to access a known database (for example database 150) through network 101 to download and install the complete custom SP data set for the service provider.

In an example embodiment, as indicated in verification action 610, the mobile device 201 is configured to do an over-the-air check through network 101 or a check through communications link 106 to confirm that the extracted SP data set 283 is up-to-date. In one example embodiment, the extracted SP data set 283 includes a version number, and mobile device 201 transmits the version number to a remote location (for example database 150) through network 101 or link 106 to verify that the version on the mobile device 201 is the most recent SP data set version. In the event that an updated version exists, the remote location responds with a diff file or patch that the mobile device 201 can use to update the out-of date portions of extracted SP data set 283. As can be appreciated, the use of a diff file or patch that includes only the subset of updated data can greatly reduce network and device resources over sending the entire SP data set to the mobile device 201. In some example embodiments, SP data set version numbers can be provided to the mobile device 201 on device activation or during periodic updates, and the mobile device 201 can be configured to request an update (for example in the form of a diff file or patch) from the custom SP data set database (such as database 150) if the mobile device 201 determines that it does not have the most recent versions. Alternative verification checks could also be performed, including checksums and the like in Action 610.

SP Time Zone Customization

It is generally desirable that a correct time zone be automatically selected for a mobile device 201 when the mobile device is first activated on its home network or on the first boot-up of the mobile device 201 after a new SIM/USIM card has been installed. Accordingly, in one example embodiment, the SP configuration data sets provided to a mobile device 201 as part of Action 604 will include a default time zone to use for the specific service provider. During action 606, the default home network time zone for the mobile device will be set to the time zone specified in the extracted SP data set 283. In an example embodiment, the mobile device 201 may be configured to automatically, after activation, compare the default time zone information with Network Information and Time Zone (NITZ) information if available on the service provider network and update the default time zone to the NITZ value if there is conflict between the NITZ specified time and the time zone specified in the extracted SP data set 283.

Software Customization

Referring to FIG. 7, Service providers may have certain applications that they want to be loaded onto mobile devices 201 that are activated on their networks. In one example embodiment, one or more of the other servers 142 is a Internet accessible software loading server 142A that may, for example, be maintained by a manufacturer or provider of mobile devices 201. The software loading server 142A implements or has access to a software database 150A that has stored on it all possible applications that all service providers who support mobile devices 201 desire to have downloaded to mobile devices 201 when they are activated on their respective networks. In an example embodiment, the software applications present on database 150A are each indexed or classified by one or more of the following: carrier identifier (CID), hardware ID and geographic or country ID, and an optional or mandatory flag.

Turning again to the device SP customization process described above in respect of FIG. 6, the custom data set for each service provider (and in particular the data included in the SP device configuration data set for each service provider) in the centralized SP database that is created in Action 602 also includes a SP application flag or field (which may for example be a binary field) that indicates whether the service provider has software applications that must be loaded onto the mobile device 602 before it is used in the service provider's network. The flag for each service provider is downloaded to each mobile device 201 as part of Action 604.

After Action 604 is completed and the custom configuration data set for a specific service provider is extracted and selected for default use on the mobile device 201 as part of initial boot-up after a new SIM/USIM card install, as indicated in Action 612, the mobile device 201 is configured to check the SP application flag to determine if the flag has been set to indicate a mandatory software download is required. If the flag indicates such a download is required the mobile device 201 is configured to initiate a download session with software loading server 142A OTA through network 101 (or through a communication link 106 in some embodiments). In at least some example embodiments, the mobile device 201 provides the software loading server 142A with one or more of a hardware ID, a carrier identity and a geographic location such as a country code. Based on such information received from the mobile device 201, the software loading server 142A determines which applications in SP applications database 150A need to be provided to the mobile device 201 and returns a list of the applications to the mobile device 201 along with an indication of whether the applications are optional or mandatory. In an example embodiment, the mobile device 201 is configured (for example by the boot-up manager 271) to display a user interface that informs the device user of application downloads that are mandatory or optional to proceed further. Once the user feedback is received indicating that the user desires to proceed with the application install and which optional applications are to be installed, the mobile device 201 proceeds to download and install from SP applications database 150A the mandatory applications and any selected optional applications.

Accordingly, the user Out-of Box Experience is affected by a carrier specific flag pre-loaded onto the mobile device during the original software load onto the device. In particular, the carrier specific flag indicates, once the device is associated with a carrier, if the device needs to access the software loading server 142A for any carrier specific application software downloads before the mobile device 201 can be used on the service provider's network. In some embodiments, the mobile device 201 is configured to check the flag for its new SP data set that is extracted whenever a new SIM/USIM is inserted so that any required applications for the new service provider network will be downloaded to the device. In some examples, the mobile device 201 is configured to check the flag after a device wipe.

SP Application Permissions

In some environments, service provider specific applications resident on a mobile device 201, including both applications downloaded through the software loading server 142A and from other sources, may require access to sensitive data stored on the mobile device 201. In order to mitigate fraudulent use of such applications it is desirable to provide an added level of device security in which access permissions for service provider specific third party applications on the mobile device 201 are tied to whether the SIM/USIM card in the device 201 corresponds to the service provider that is associated with the requesting application. In one example embodiment, a trusted access permission module 277 is installed on the mobile device 201 to control access permissions granted to service provider specific applications. Access permission module 277 could for example be a standalone application or part of the boot manager 271 or other application or operating system 223 software installed on the mobile device 201 during the original software build. Alternatively, access permission module 277 could be downloaded from SP applications database 150A as a mandatory download during Action 612.

In an example embodiment, when mobile device 201 is first turned on once a new SIM/USIM card is inserted, as part of the boot-up process the access permission module 277 sets access permissions for any service provider specific applications that are installed on the mobile device 201 by confirming that the service provider identified based on data on the SIM/USM card corresponds to the service provider associated with the requesting applications. This verification matching process could include one or more of the following verification actions: (1) the access permission module 277 may compare a service provider ID received by the mobile device through a source other than the SIM/USIM card, for example by way of an ECID code provided to the mobile device 201 as detailed above in respect of Action 304 or Action 506 in the context of MEP locking, and then compare the ECID code to see if it corresponds to service provider information derived from the SIM/USIM card; (2) the access permission module 277 may acquire a service provider ID received by the mobile device over the air through a network source and then compare that ID to see if it corresponds to service provider information derived from the SIM/USIM card; (3) the access permission module 277 may compare identification information contained in the SP configuration data set loaded onto the device in Actions 606 or 610 to see if it corresponds to service provider information derived from the SIM/USIM card; or (4) the access permission module 277 may compare SP identification information embedded or included with applications downloaded to the device 201 (for example from software loading server 142A) to see if it corresponds to service provider information derived from the SIM/USIM card. In the event that one or more of the verification procedures executed by the access permission module 277 indicate a service provider mismatch, access permissions will not be set for the SP application to access the restricted data. In an example embodiment, an access permissions record is maintained on the device 201 that identifies which SP applications have current access permission. In an example embodiment, the access permissions are erased once the SIM/USIM card that triggered the granting of the access permissions is subsequently removed. Subsequent insertion of a new SIM/USIM card will cause the access permission module 277 to create a new set of access permissions based on the service provider associated with the new SIM/USIM card.

Accordingly, in such an embodiment, in order to provide improved security of restricted data, an additional level of security is provided which ties the access permissions needed by the carrier specific applications to whether or not the designated carrier's SIM/USIM is in the device 201 and enabled. These access permissions are dynamically granted only by a trusted and privileged application based on SIM insertion and are revoked based on SIM removal.

The actions and/or operations in the flowcharts and drawings described herein are for purposes of example only. There may be many variations to these actions and/or operations without departing from the teachings of the present disclosure. For instance, the actions may be performed in a differing order, or actions may be added, deleted, or modified.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description.

The invention claimed is:

1. A method for customizing a mobile device, the method comprising:
   receiving at the mobile device information providing a service provider identity;
   selecting, from a plurality of customized data sets stored on the mobile device a data set that corresponds to the service provider identity, at least one of the customized data sets including service provider specific data indicating at least one of: service provider applications that are to be loaded onto the mobile device, branding information for the service provider, and time zone information for the service provider; and
   activating the selected data set on the mobile device.

2. The method of claim 1 wherein the customized data sets further include service provider (SP) personalization policies, and selecting includes selecting the SP personalization policy that corresponds to the service provider identity, and activating the selected data set includes storing the selected SP personalization policy in a protected storage element of the mobile device to prevent unauthorized alteration of the selected SP personalization policy.

3. The method of claim 2 comprising storing the plurality of SP personalization policies on the mobile device during a pre-delivery software installation on the mobile device, the plurality of SP personalization policies including SP personalization policies for all service providers to which the mobile device could be delivered.

4. The method of claim 2 wherein the selected SP personalization policy locks the mobile device to a service provider identified by the service provider identity.

5. The method of claim 2 further comprising restricting or preventing use of the mobile device if the selected SP personalization policy does not correspond to a network access module inserted into the mobile device.

6. The method of claim 2 comprising, after the receiving, storing the service provider identity on the mobile device for future use by the mobile device for selecting the selected SP personalization policy, and selecting the selected SP personalization is performed on a boot-up of the mobile device subsequent to the service provider identity being stored on the mobile device.

7. The method of claim 2 wherein receiving at the mobile device the information providing the service provider identity comprises accessing a predetermined database over a communications link on a boot-up of the mobile device and providing a unique identifier for the mobile device, wherein the information providing the service provider identity is received at the mobile device from the database and depends on the unique identifier.

8. The method of claim 1 wherein the service provider specific data further includes one or more of: a set of error messages and associated error codes for a service provider and mobile device configuration specifications for the service provider.

9. The method of claim 8 wherein receiving at the mobile device information providing the service provider identity comprises reading information for a network access control module inserted into the mobile device and activating the selected data set on the mobile device comprises setting one or more of error messages used by the mobile device, branding information used by the mobile device or device configurations used by the mobile device to correspond to information included in the selected data set.

10. The method of claim 1 wherein activating the selected data set comprises, when the service provider specific data indicates that service provider applications are to be loaded on the mobile device, accessing a server through a network and obtaining a list of applications to be loaded onto the mobile device for the service provider identity.

11. The method of claim 10 comprising determining if service provider applications loaded on the mobile device are to be granted data access permissions in dependence of whether service provider information associated with the applications corresponds to service provider information obtained from a network access module inserted into the mobile device.

12. The method of claim 1 wherein activating the selected data set comprises setting a default time zone on the mobile device to that indicated in the service provider specific data.

13. A mobile device configured to automatically customize for a service provider, comprising:
   a controller for controlling the operation of the device;
   a communication subsystem connected to the controller configured for at least data communication with a wireless network; and
   a first storage element having stored thereon a plurality of customized data sets, each customized data set being indexed by a unique service provider identity;
   the controller being configured for:
   receiving service provider identity information;
   selecting, from the plurality of customized data sets a data set indexed by the unique service provider identity that corresponds to the received service provider identity information, at least one of the customized data sets including service provider specific data indicating at least one of: service provider applications that are to be loaded onto the mobile device, branding information for the service provider, and time zone information for the service provider; and
   activating the selected data set on the mobile device.

14. The device of claim 13 wherein the mobile device comprises a second storage element that is protected against unauthorized alteration, and the customized data sets include service provider (SP) personalization policies, and activating the selected data set includes storing the SP personalization policy of the selected data set in the second storage element of the mobile device to prevent unauthorized alteration of the selected SP personalization policy.

15. The device of claim 14 wherein the data sets include SP personalization policies for all service providers on which the mobile device may be activated.

16. The device of claim 14 wherein the SP personalization policy of the selected data set locks the mobile device to a service provider identified by the service unique provider identity.

17. The device of claim 14 further comprising an interface slot for receiving a network access control module, wherein activating the data set comprises restricting or preventing use of the mobile device if the selected SP personalization policy of the selected data set does not correspond to a network access module inserted into the mobile device.

18. The device of claim 17, the controller being configured to store the service provider identity information on the mobile device for future use by the mobile device for selecting the selected data set, and to select the selected data set on a boot-up of the mobile device subsequent to the service provider identity information being stored on the mobile device.

19. The device of claim 13 wherein the service provider specific data further includes one or more of: a set of error messages and associated error codes for a service provider and mobile device configuration specifications for the service provider.

20. The device of claim 19 wherein receiving service provider identity information comprises reading information for a network access control module inserted into the mobile device and activating the selected data set on the mobile device comprises setting one or more of error messages used by the mobile device and device configurations used by the mobile device to correspond to information included in the selected data set.

21. A computer program product comprising a non-transitory computer readable medium having stored thereon computer executable instructions that when executed by a mobile device perform a method for customizing the mobile device, the method comprising:
   receiving at the mobile device information providing a service provider identity; selecting, from a plurality of customized data sets stored on the mobile device a data set that corresponds to the service provider identity, at least one of the customized data sets including service provider specific data indicating at least one of: service provider applications that are to be loaded onto the mobile device, branding information for the service provider, and time zone information for the service provider; and
   activating the selected data set on the mobile device.

* * * * *